UNITED STATES PATENT OFFICE.

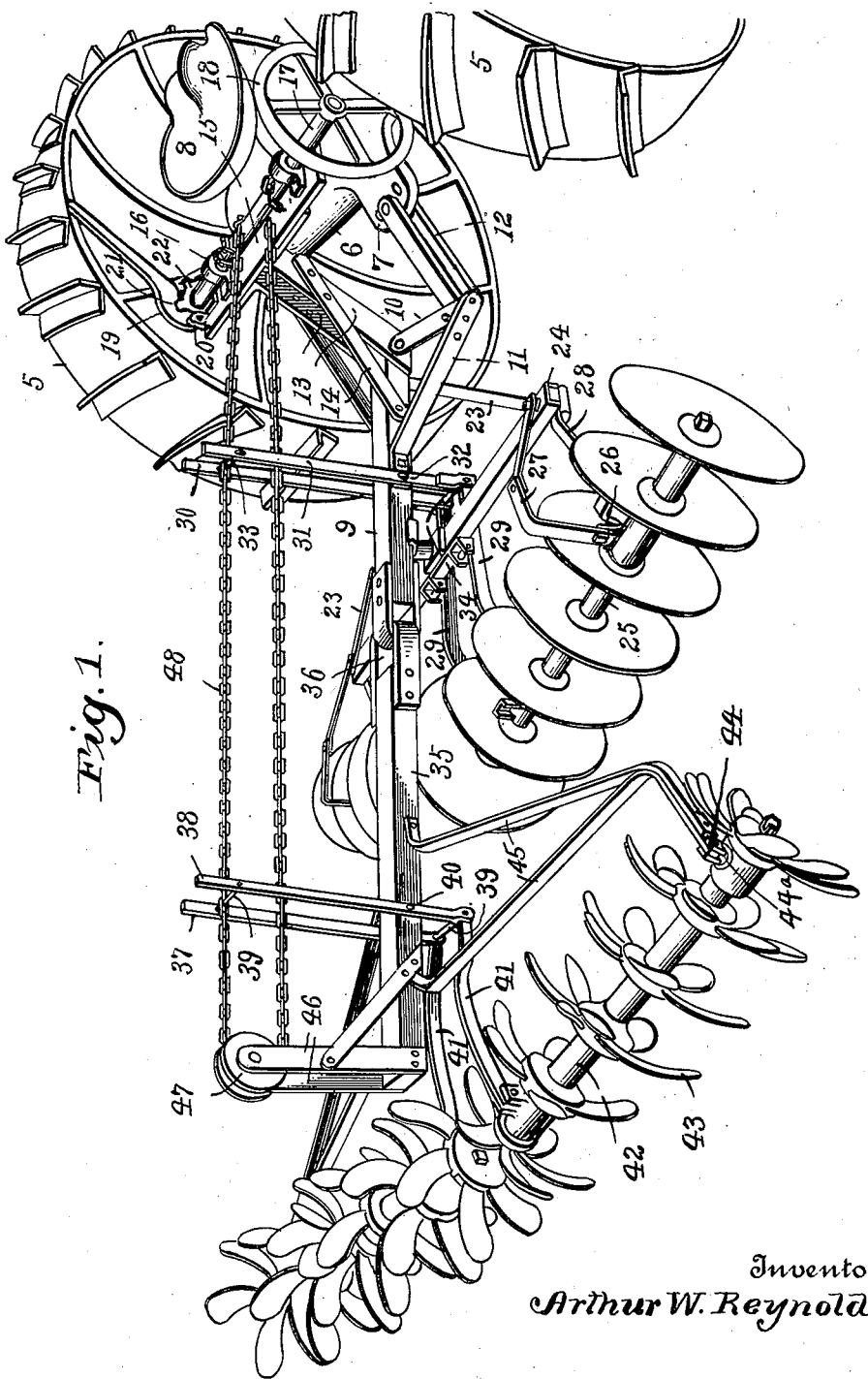

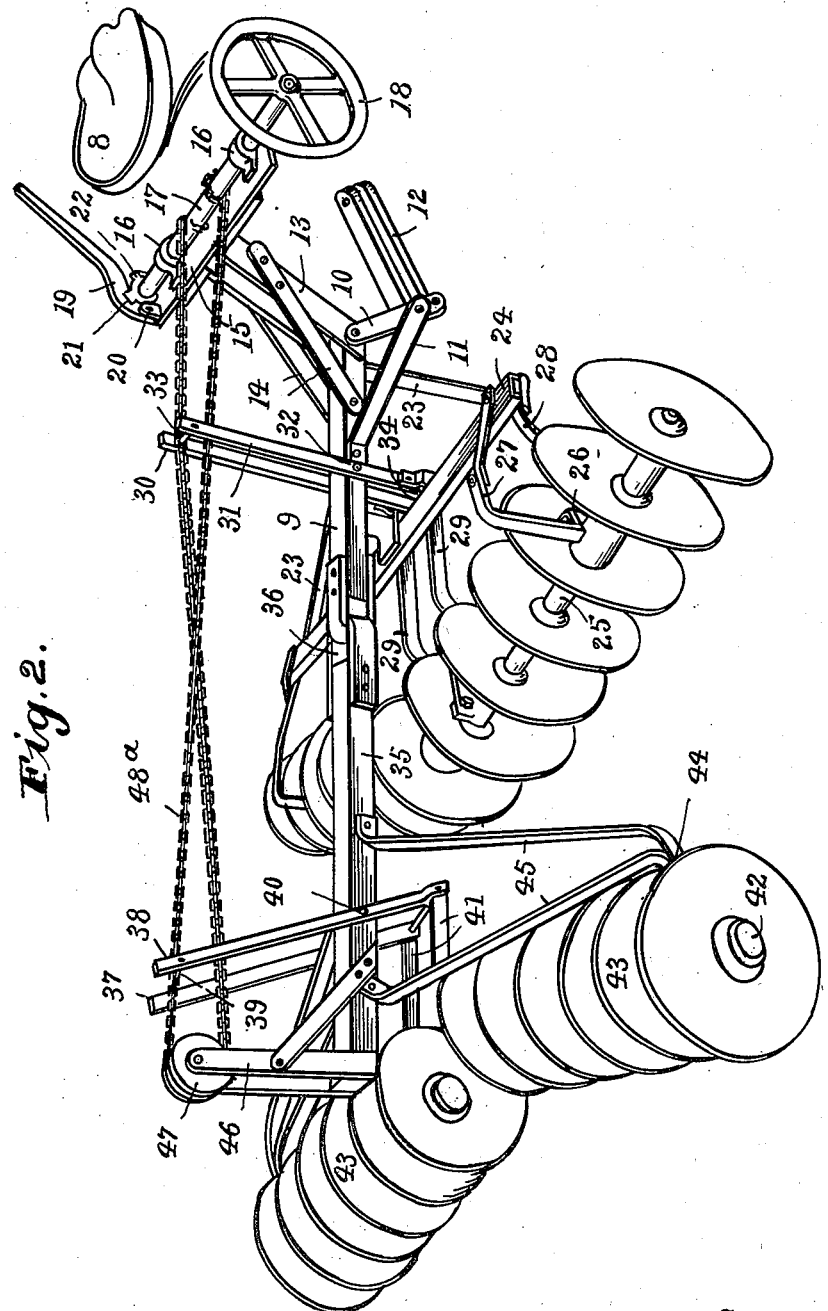

ARTHUR W. REYNOLDS, OF NEWTOWN, CONNECTICUT.

TRACTOR-HARROW-OPERATING MECHANISM.

1,341,824.   Specification of Letters Patent.   Patented June 1, 1920.

Application filed May 10, 1919. Serial No. 296,100.

*To all whom it may concern:*

Be it known that I, ARTHUR W. REYNOLDS, a citizen of the United States, and resident of Newtown, in the county of Fairfield and State of Connecticut, have invented certain new and useful Improvements in Tractor-Harrow-Operating Mechanism, of which the following is a specification.

My invention relates to new and useful improvements in means for manipulating the operating levers of tractor harrows, directly from the seat of a tractor, when connected thereto.

The purpose of the invention is to provide simple and inexpensive means for operating disk, spading or other forms of harrows when connected to be drawn by a tractor; to provide means whereby the tractor operator may shift and angle the gangs of harrows, with respect to the draw-beams, so that the cutting disks of the rear gangs can be made to follow behind those of the front gang while traveling over the road and between fields or angled as required when harrowing; to provide a device of the above sort which can be readily applied to standard makes of harrows now in use, whether the sets of gangs are flexibly or rigidly connected, without materially altering or changing their design; and finally to design the construction so that the same may be connected in the usual way, to commercial forms of tractors.

With these and other objects in view the invention resides and consists in the construction and novel combination and arrangements of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which.

Figure 1 shows a perspective view of a disk harrow and spading harrow flexibly connected together in tandem and attached to a tractor and provided with my improved operating mechanism in a way to be manipulated from the seat of the tractor, and Fig. 2 is a somewhat similar perspective view but including two disk harrows and showing the position of the gangs reversed.

My improved operating device may be used to operate a single harrow or two of the same or different kinds when connected one behind the other. In Fig. 1 of the drawings I have shown a common form of disk harrow as the front harrow and a spading harrow as the rear harrow, while in Fig. 2 I have shown the invention applied to two disk harrows which are alike in construction.

Referring in detail to the characters of reference marked upon the drawings, 5 represents a pair of tractor wheels, 6 an axle casing and 7 a draw bar cap to which the forward harrow is detachably connected. 8 represents the tractor seat mounted upon the tractor. To the draw beam 9 of the forward harrow are attached links 10 and 11 and whose outer ends are connected to a clevis 12 which in turn is bolted to the draw bar cap 7 of the axle casing, and which serves as the operative connection of the harrow to the tractor.

Upon the forward end of this beam 9 are also provided upwardly disposed standards 13 that are provided with braces 14 which serve to support the table 15. Upon this table are provided bearings 16 in which the shaft 17 is journaled. A hand wheel 18 is mounted upon one end of this shaft and is positioned along side of the seat 8 and in close proximity thereto, so that it may be turned by the operator while the tractor is moving. A locking dog 19 is pivoted at 20 to a stud upon the table 15 and is provided with a notch 21 that engages one of a series of teeth on a segment 22 upon the shaft 17 to hold the same against turning but which may be readily disconnected by one hand of the operator while he turns the wheel with the other.

Braces 23 connect the forward end of the draw-beam with the cross bar 24 secured to the underside of the draw-beam. The forward harrow includes two gangs, each of which comprises a shaft 25 and a series of disks mounted thereon. The outer end portion of each shaft is pivotedly connected at 26 to the arms 27 and 28 carried by the cross bar. This leaves each gang of disks free to be swung upon the said pivots 26 through the movement of the links 29 whose rear ends are pivotedly connected to the said shafts and whose forward ends are also pivotedly attached to the lower ends of the operating levers 30 and 31 respectively. These levers are pivotedly attached to the draw-beam 9 at 32 and their upper ends are connected together by a rod 33 and the lower ends are similarly connected by a rod 34 so as to insure a like forward and backward operation of the two levers simultaneously and for the purpose of shifting the angle of the gangs of disks with which they are connected.

The draw beam 35 of the rear harrow is swivelly connected to the rear end of the front draw-beam at 36 in a way to form a flexible connection between the two. The operating levers 37 and 38 of the rear harrow have their upper ends, as well as their lower ends, connected together by rods 39, in a similar manner to the before mentioned levers 30 and 31. These rear levers are pivoted to the draw-beam 35 at 40 and are adapted to be swung forward and backward. The forward ends of the links 41 are pivotedly connected to the lower ends of the levers 37 and 38 while the rear ends are similarly connected to the inner end portions of the shafts 42 upon which the disks 43 are mounted. The braces 45 extend out from the draw-beam 35 and are connected to the studs 44 mounted to turn in a bearing 44ª supporting the outer ends of the rear gangs and which are adapted to be adjusted forward and backward similar to the gangs of the forward harrow through the movement of the operating chain 48 and its actuating means.

Upon the rear end of the draw-beam 35 is provided standards 46 that carry an idler wheel 47 over which the operating chain 48 is guided. The upper section of this chain is connected with the rods 33 and 39 so as to move the same and the levers in which they are mounted. The forward end of the upper section of the chain is connected with and over the top side of the shaft 17 while the other end of the chain is connected to wind upon the under side, thereupon it will be seen that when the shaft is turned in one direction one end of the chain is wound on the shaft, and the two sets of levers moved in one direction, whereas if the shaft is turned in the opposite direction the other end is wound on, and the levers shifted in the opposite direction. Either of these operations would tend to shift the relative position of the four gangs in unison, whereas with the cross chain connection 48ª as shown in Fig. 2 the condition would be reversed, with the result that the inner ends of the forward gangs of disks would be moved rearward simultaneously with the forward movement of the inner ends of the sections of the rear harrow so as to angle the same as indicated in Fig. 2. On the other hand if it is desired to position the gangs parallel or at an opposite angle so that the outer ends of the two gangs would be brought closer together and the inner ends farther apart the same would be accomplished by a reverse rotary movement of the hand wheel and which through the shaft and chain connections would shift the levers in a manner to bring about the desired change.

Having thus described my invention, what I claim and desire to secure by Letters Patent, is

1. The combination with the draw-beam of a tractor harrow having levers and connections for angling the gangs of disks, of a shaft carried upon the draw-beam adjacent to its point of attachment to a tractor, and provided with operating means, and a chain connecting the shaft with the levers for operating the same to shift the gangs of disks.

2. The combination with the draw-beam of a tractor harrow having levers and connections for angling the gangs of disks, of a support carried thereon adjacent to its point of attachment to a tractor, a shaft mounted on the support and provided with operating means, and a chain connecting the shaft with the levers for operating the same to shift the gangs of disks.

3. The combination with the draw-beams of a pair of tractor harrows coupled together one behind the other, and having levers and connections for angling the gangs of disks, of a shaft carried upon the draw-beam of the forward harrow adjacent to its point of attachment to a tractor and provided with operating means, and a chain connecting the shaft with the levers of both harrows for operating the same to shift the gangs of disks of the two harrows simultaneously.

4. The combination with the draw-beam of a tractor harrow having levers and connections for angling the gangs of disks, of a support carried thereon adjacent to its point of attachment to a tractor, a shaft mounted on the support and provided with operating means, an idler carried upon the draw-beam, and a chain connecting the shaft with the levers and guided over the idler for operating the levers to shift the gangs of disks.

5. The combination with the draw-beams of a pair of tractor harrows coupled together one behind the other, and having levers and connections for angling the gangs of disks, of a shaft carried upon the draw-beam of the forward harrow adjacent to its point of attachment to a tractor, a wheel upon the shaft for operating the same, means for holding the shaft against rotation, and a chain connected to the two sides of the shaft and with the levers of both harrows for operating the same to shift the gangs of disks of the two harrows simultaneously.

Signed at Bridgeport in the county of Fairfield and State of Connecticut this first day of May, A. D., 1919.

ARTHUR W. REYNOLDS.

Witnesses:
C. M. NEWMAN,
LILLIAN M. ALLING.